United States Patent [19]
Ichikawa

[11] Patent Number: 5,383,210
[45] Date of Patent: Jan. 17, 1995

[54] OPTICAL PHASE LOCKED LOOP CIRCUIT

[75] Inventor: Akio Ichikawa, Tokyo, Japan

[73] Assignee: Ando Electric Co., Ltd., Tokyo, Japan

[21] Appl. No.: 186,595

[22] Filed: Jan. 26, 1994

[30] Foreign Application Priority Data

Jan. 28, 1993 [JP] Japan .................. 5-032608

[51] Int. Cl.6 .............................. H01S 3/00
[52] U.S. Cl. ..................................... 372/38
[58] Field of Search ................. 372/38; 356/4.5, 345, 356/349, 350

[56] References Cited

U.S. PATENT DOCUMENTS 5,157,462 10/1992 Hahn ..................... 372/94

Primary Examiner—Rodney B. Bovernick
Assistant Examiner—Robert E. Wise
Attorney, Agent, or Firm—Finnegan, Henderson, Farabow, Garrett & Dunner

[57] ABSTRACT

An optical phase locked loop circuit, which controls so that the optical frequency of the light 19A generated by the slave laser 19 has the offsetting factor to the optical frequency of the coherent light 11A generated by the master laser 11, corresponding to the frequency of the signal 16A generated by the signal generator 16, is provided with a LPF 1, an optical power controller 2 and a variable optical attenuator 3. Upon detecting the phase difference caused by the difference frequency between the light 19A and the coherent light 11A, the output control light 3A is obtained by transmitting the output control light 20B through the variable optical attenuator 3. The signal 13B proportional to the optical power of the output control light 3A is extracted by the LPF 1. The optical power of the light 3A is stabilized by using the optical power controller 2 and the variable optical attenuator 3 in order to vary the optical power attenuation in the light 20B corresponding to the extracted signal 13B.

1 Claim, 2 Drawing Sheets

OPTICAL PHASE LOCKED LOOP CIRCUIT

BACKGROUND OF THE INVENTION

1. Field of the Invention

The present invention relates to an optical phase locked loop circuit for synchronizing the phase of a light source in optical communications or optical measuring instruments.

2. Background Art

FIG. 2 shows an optical phase locked loop circuit in the prior art. In this figure, the optical circuit comprises a stability controller 10, a master laser 11, an optical coupling device 12, a photodetector 13, a high-pass filter(HPF) 14, a phase comparator 15, a signal generator 16, a low-pass filter (LPF) 17, an optical frequency controller 18, a slave laser 19, and an optical branching device 20.

The stability controller 10 controls the master laser 11 in order to stabilize an optical power $P_M$ and an optical frequency $f_M$ of a coherent light 11A generated by the master laser 11. The coherent light 11A is supplied to the optical coupling device 12. This device 12 couples the coherent light 11A with an output control light 20B. The light 20B is separated from an output light 19A of the slave laser 19 by the optical branching device 20 and has an optical power $P_S$ and an optical frequency $f_S$.

The photodetector 13 heterodynes the coupled light 12A received from the coupling device 12, and outputs a frequency difference signal 13A, a proportional signal 13B and a proportional signal 13C. The amplitude of the difference signal 13A is proportional to the product between the square root of the optical power $P_M$ of the coherent light 11A and the square root of the optical power $P_S$ of the output control light 20B. The frequency of the signal 13A is the difference frequency $\Delta f = f_S - f_M$ between the frequency $f_S$ of the output control light 20B and the frequency $f_M$ of the coherent light 11A. The amplitude of the signal 13B is proportional to the optical power $P_S$ of the light 20B. The amplitude of the signal 13C is proportional to the optical power $P_M$ of the coherent light 11A.

The optical power $P_S$ of the output control light 20B varies in correspondence to the output frequencies of the slave laser 19 controlled by the optical frequency controller 18, therefore the signal 13B contains a low frequency component corresponding to the time-dependent variation of the optical power $P_S$. The optical power $P_M$ of the coherent light 11A is stabilized by the stability controller 10, therefore the signal 13C constitutes a direct current component which does not vary with time.

The HPF 14 receives the signals 13A,13B,13C generated by the photodetector 13, and transmits the difference component $\Delta f$ of the difference frequency signal 13A to the phase comparator 15 by filtering the low frequency component and the direct current component included in the signals 13B,13C.

The phase comparator 15 compares the phase of the difference frequency signal 13A and the phase of a signal 16A having an amplitude $E_H$ and a frequency $f_H$. If there is a phase difference caused by a difference in the frequencies between the signal 13A and the signal 16A(i.e. $f_H \neq \Delta f$), the phase comparator 15 outputs a signal 15A having an amplitude which is proportional to the product between the square root of the amplitude $(P_M \cdot P_S)$ of the difference frequency signal 13A and the amplitude $E_H$ of the signal 16A, and having a frequency which constitutes a difference frequency component $\Delta F = f_H - \Delta f$ between the signal 13A and the signal 16A. If there is a phase difference, even if the frequency of the difference frequency signal 13A is the same as that of the signal 16A(i.e. $f_H = \Delta f$), the phase comparator 15 outputs a signal 15A having an amplitude which is proportional to the product between the square root of the amplitude $(P_M \cdot P_S)$ of the difference frequency signal 13A and the amplitude $E_H$ of signal 16A, and being in correspondence to the phase difference between the difference frequency signal 13A and the signal 16A.

The output signal 15A of the phase comparator 15 is supplied to the optical frequency controller 18 after filtering noise components by the LPF 17. The optical frequency controller 18 generates a signal 18A, which is supplied to the slave laser 19 in order to vary its optical frequency, so as to make $f_H$ equal to $\Delta f$(i.e. $f_H = \Delta f$), and the phase difference between the difference frequency signal 13A and the signal 16A to become zero.

The slave laser 19 outputs the light 19A of a controlled optical frequency $f_S$ in accordance with the signal 18A supplied from the optical frequency controller 18. The light 19A is guided to the optical branching device 20. In this device 20, the light 19A is separated into an external output light 20A and the output control light 20B. The output control light 20B is guided to the optical coupling device 12.

In the configuration shown in FIG. 2, The amplitude of the difference frequency signal 13A varies when the optical power $P_S$ of the output control light 20B varies with time, because the amplitude of the frequency signal 13A supplied to the phase comparator 15 via the HPF 14 is proportional to the square root of the optical power $P_S$ of the output control light 20B.

Therefore, the amplitude of the output signal 15A from the phase comparator 15 varies even if $f_H$ is made equal to $\Delta f$ (i.e. $f_H = \Delta f$) and the phase difference between the difference frequency signal 13A and the signal 16A is eliminated. This amplitude variation of the output signal 15A from the phase comparator 15 results in the variations in the optical frequency of the output light 19A from the slave laser 19.

SUMMARY OF THE INVENTION

The object of the invention is therefore to provide an optical phase locked loop circuit enabling to stabilize the optical frequency of the output light 19A from the slave laser 19. For this object, according to the present invention, the output control light 3A having a stable optical power is obtained by varying the optical power attenuation of the output control light 20B corresponding to the signal 13B proportional to the optical power of the output control signal 3A, using a low-pass filter, an optical power controller and a variable optical attenuator.

To satisfy this object, the present invention provides an optical phase locked loop circuit, comprising;

a stability controller for stabilizing the optical frequency and the optical power of a laser;

a master laser for continuously outputting a coherent light whose optical frequency and optical power is stabilized by said stability controller:

an optical coupling device which receives said coherent light supplied from said master laser as the first input light:

a photodetector for heterodyning a coupled light received from said optical coupling device;

a high-pass filter for extracting a difference frequency signal between said coherent light and an output control light from signals supplied by said photodetector;

a phase comparator for phase comparing the difference frequency signal extracted by said high-pass filter and a signal supplied from a signal generator, and outputting a signal proportional to the phase difference between them;

a low-pass filter for filtering noise components from the signal supplied by said phase comparator;

an optical frequency controller for generating an optical frequency control signal corresponding to the signal transmitted through said low-pass filter;

a slave laser whose optical frequency varies corresponding to the signal supplied from said optical frequency controller;

an optical branching device for separating an output light of the slave laser into an external output light and an output control light which is supplied to said optical coupling device as its second input light;

a low-pass filter for extracting a signal proportional to the optical power of said output control light and a signal proportional to the optical power of said coherent light by filtering said difference frequency signal from the output of said photodetector;

an optical power controller for generating a control signal corresponding to the signals transmitted through said low-pass filter;

a variable optical attenuator, provided between said optical branching device and said optical coupling device, for varying the attenuation of the optical power of said output control light corresponding to said control signal in order to supply said output control light having a stable optical power to said optical coupling device.

DETAILED DESCRIPTION OF THE PREFERRED EMBODIMENTS

Figure 1:
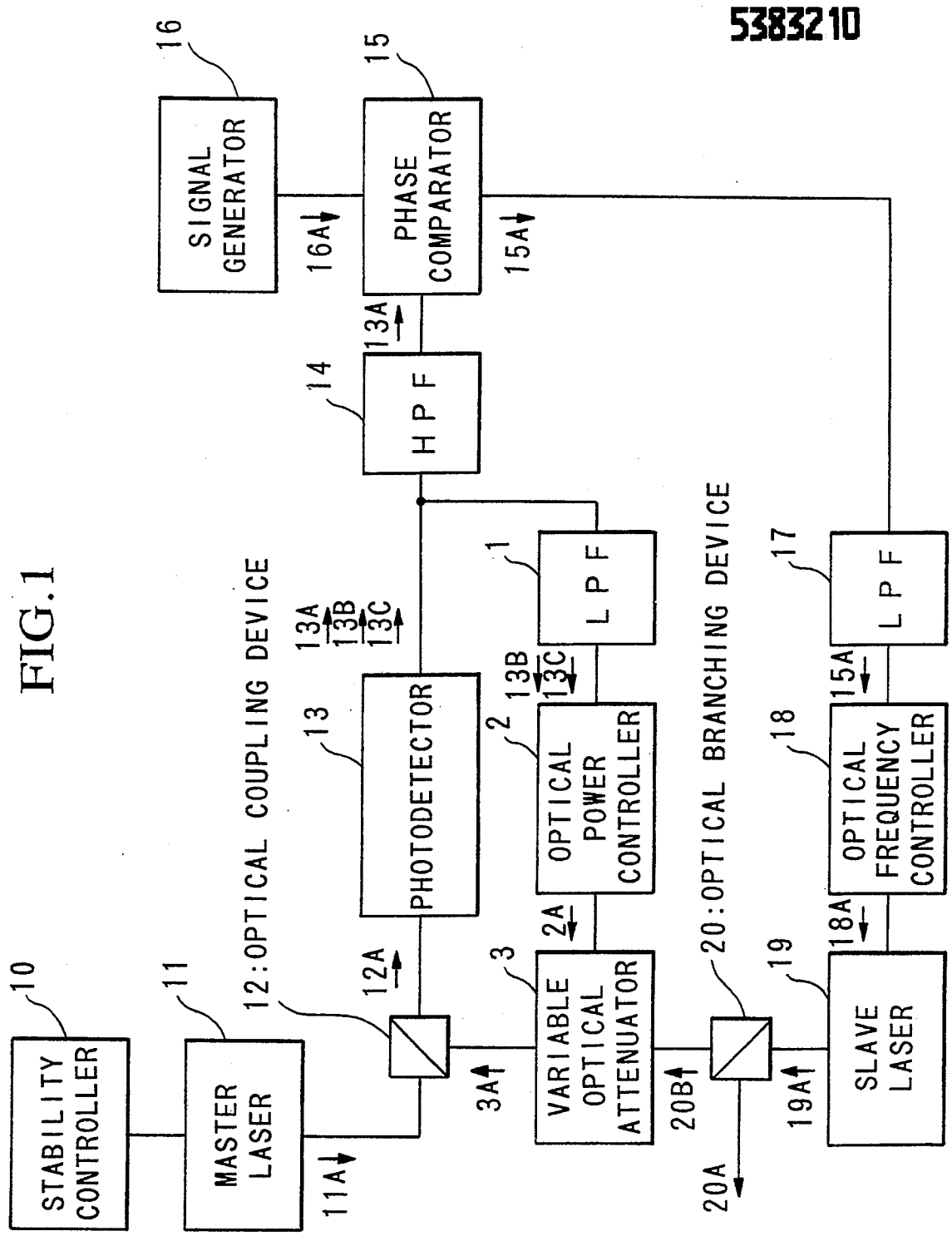
FIG. 1 shows a block diagram representing an optical phase locked loop circuit according to the present invention.
Figure 2:
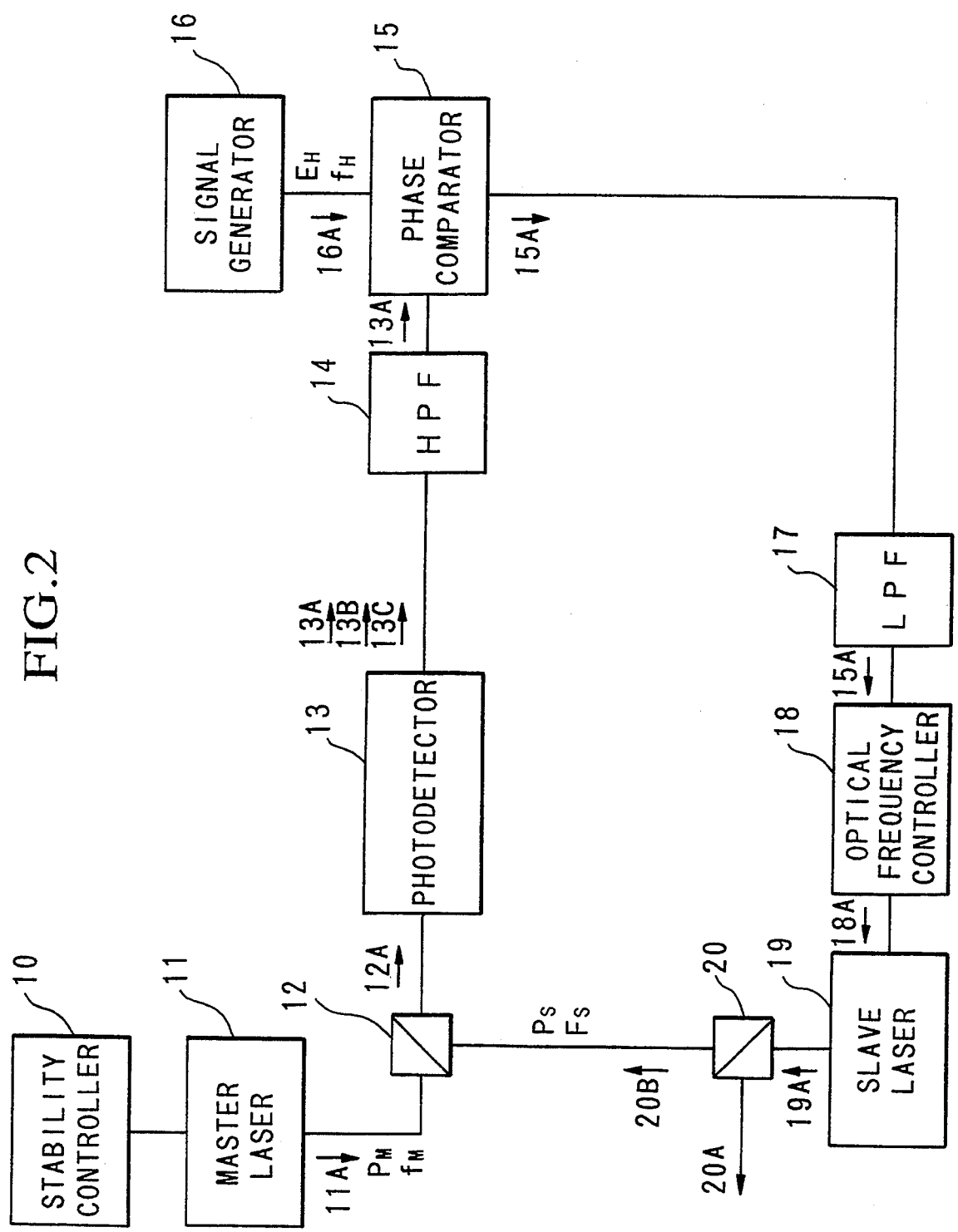
FIG. 2 shows a block diagram representing an optical phase locked loop circuit according to the prior art.

Hereinafter, a preferred embodiment of the present invention will be explained with reference to FIG. 1. FIG. 1 shows a block diagram representing an optical phase locked loop circuit according to the present invention. In this figure, numeral 1 is a low-pass filter(LPF), numeral 2 is an optical power controller, and numeral 3 is a variable optical attenuator. The other numerals represents the same components as shown in FIG. 2.

In FIG. 1, the LPF 1 receives the signals supplied from the photodetector 13. The output of the LPF 1 is supplied to the optical power controller 2, and the output of the controller 2 is supplied to the variable optical attenuator 3. The attenuator 3 receives the output of the optical branching device 20 as the first input and the output of the optical power controller 2 as the second input, and outputs the output control light 3A to the optical coupling device 12.

The LPF 1 filters the difference frequency signal 13A having the-difference frequency component $\Delta f$ from the signals 13A,13B,13C supplied by the photodetector 13, and transmits the signal 13B constituting a low frequency component corresponding to the time-dependent variation in the optical power of the output control light 3A, and the signal 13C constituting the a direct current component. The transmitted signals 13B,13C are supplied to the optical power controller 2.

The time varying component included in the signals 13B,13C transmitted through the LPF 1 is only the time varying component in the optical power of the output control light 3A included in the signal 13B. The optical power controller 2 generates the signal 2A for driving the variable optical attenuator 3 so as to eliminate the time varying component in the signal 13B.

The variable optical attenuator 3 is controlled by the signal 2A supplied from the optical power controller 2 in such a way that the attenuation is increased when the optical power of the output control light 20B from the optical branching device 20 is high; and is decreased when the optical power of the light 20B is low. Accordingly, the optical power of the output control light 3A obtained by transmitting the output control light 20B through the variable optical attenuator 3 is stabilized, so that the frequency of the output light 19A from the slave laser 19 is stabilized.

In this way, according to the present invention, it is possible to stabilize the optical power of the output control light used for controlling the optical frequency of the slave laser. Therefore, an optical phase locked loop circuit can be provided, in which the optical frequency of the output light from the slave laser is stable.

What is claimed is:

1. An optical phase locked loop circuit, comprising;
a stability controller (10) for stabilizing the optical frequency and the optical power of a laser;

a master laser (11) for continuously outputting a coherent light (11A) whose optical frequency and optical power is stabilized by said stability controller (10);

an optical coupling means (12) which receives said coherent light (11A) supplied from said master laser (11) as the first input light;

a photodetector (13) for heterodyning a coupled light (12A) received from said optical coupling means (12);

a high-pass filter (14) for extracting a difference frequency signal (13A) between said coherent light (11A) and an output control light (3A) from signals supplied by said photodetector (13);

a phase comparator (15) for phase comparing the difference frequency signal (13A) extracted by said high-pass filter (14) and a signal (16A) supplied from a signal generator (16), and outputting a signal (15A) proportional to the phase difference between them;

a low-pass filter (17) for filtering noise components from the signal (15A) supplied by said phase comparator (15);

an optical frequency controller (18) for generating an optical frequency control signal (18A) corresponding to the signal (15A) transmitted through said low-pass filter (17);

a slave laser (19) whose optical frequency varies corresponding to the signal (18A) supplied from said optical frequency controller (18);

an optical branching means (20) for separating an outpost light (19A) of the slave laser (19) into an external output light (20A) and an output control light (20B) which is supplied to said optical coupling means (12) as its second input light;

a low-pass filter (1) for extracting a signal (13B) proportional to the optical power of said output control light (3A) and a signal (13C) proportional to the optical power of said coherent light (11A) by filtering said difference frequency signal (13A) from the output of said photodetector (13);

an optical power controller (2) for generating a control signal (2A) corresponding to the signals (13B,13C) transmitted through said low-pass filter (1);

a variable optical attenuator (3), provided between said optical branching means (20) and said optical coupling means (12), for varying the attenuation of the optical power of said output control light (20A) corresponding to said control signal (2A) in order to supply said output control light (3A) having a stable optical power to said optical coupling means (12).

* * * * *